United States Patent [19]

Messmer et al.

[11] Patent Number: 4,670,524

[45] Date of Patent: Jun. 2, 1987

[54] PREPARATION OF WATER-SOLUBLE POLYMER POWDERS AND THEIR USE

[75] Inventors: Karlheinz Messmer, Weisenheim; Karl Hennig, Hessheim; Walter Denzinger, Speyer; Albert Hettche, Hessheim; Wolfgang Trieselt, Ludwigshafen; Hans-Juergen Raubenheimer, Ketsch, all of Fed. Rep. of Germany

[73] Assignee: BASF Aktiengesellschaft, Ludwigshafen, Fed. Rep. of Germany

[21] Appl. No.: 857,134

[22] Filed: Apr. 29, 1986

[30] Foreign Application Priority Data

May 25, 1985 [DE] Fed. Rep. of Germany ....... 3519013

[51] Int. Cl.$^4$ .............................................. C08F 4/28
[52] U.S. Cl. ...................................... 526/88; 526/909
[58] Field of Search ...................... 526/63, 71, 88, 909

[56] References Cited

U.S. PATENT DOCUMENTS

| 4,135,043 | 1/1979 | Kast | 526/63 |
| 4,247,434 | 1/1981 | Lovelace | 526/88 |
| 4,458,057 | 7/1984 | Basu | 526/88 |

Primary Examiner—Paul R. Michl
Attorney, Agent, or Firm—Oblon, Fisher, Spivak, McClelland & Maier

[57] ABSTRACT

Water-soluble polymer powders are prepared by polymerizing water-soluble ethylenically unsaturated monomers in a powder bed in the presence of polymerization initiators and water while maintaining the powder state, removing the heat of polymerization by distilling off water and circulating the reaction mixture, by a process in which water-insoluble organic peroxides which are liquid at 20° C. are used alone or as a mixture with up to 50% by weight, based on the initiator mixture, of water-soluble, organic azo initiators and/or water-insoluble solid peroxy-containing compounds, as polymerization initiators.

8 Claims, No Drawings

PREPARATION OF WATER-SOLUBLE POLYMER POWDERS AND THEIR USE

U.S. Pat. No. 4,135,043 discloses a process for the preparation of water-soluble polymer powders, in which water-soluble ethylenically unsaturated monomers are polymerized in a powder bed in the presence of water-soluble polymerization initiators and water as an ancillary liquid, while maintaining the powder state, removing the heat of polymerization by distilling off water, and circulating the reaction mixture. The water-soluble polymerization initiators used in this procedure are hydrogen peroxide, sodium peroxydisulfate or potassium peroxydisulfate. If ethylenically unsaturated carboxylic acids, such as acrylic acid or maleic acid, are polymerized by the conventional method, evolution of $CO_2$ is observed during the polymerization. This gives polymers which contain fewer than the theoretical number of carboxyl groups per part by weight of the substance. The ability of the polymers prepared in this manner to complex with calcium and magnesium ions is therefore unsatisfactory.

It is an object of the present invention to provide a process for the preparation of water-soluble polymer powders by polymerization of water-soluble ethylenically unsaturated monomers in a powder bed in the presence of a polymerization initiator and water, while maintaining the powder state, removing the heat of polymerization by distilling off water, and circulating the reaction mixture, in which formation of carbon dioxide during the polymerization does not occur to the same extent as in the conventional process.

We have found that this object is achieved, according to the invention, if water-insoluble organic peroxides which are liquid under 1013 mbar and at 20° C. are used alone, or as a mixture with up to 50% by weight, based on the initiator mixture, of water-soluble azo initiators and/or water-insoluble peroxy-containing compounds which are solid at 20° C., as polymerization initiators.

Examples of water-soluble ethylenically unsaturated compounds are $C_3$-$C_5$-carboxylic acids and their amides and nitriles. Compounds preferably polymerized according to the invention are acrylic acid, methacrylic acid, itaconic acid or maleic acid, or maleic anhydride, from which maleic acid is formed in the presence of water. The preparation of copolymers of acrylic acid or methacrylic acid and maleic acid is particularly preferred. Copolymers of this type preferably contain from 10 to 70% by weight of maleic acid and from 90 to 30% by weight of acrylic acid and/or methacrylic acid as copolymerized units. The ethylenically unsaturated carboxylic acids can be subjected to the polymerization in the form of the free acids or in a form partially or completely neutralized with a base. The neutralization of the carboxyl groups may also be effected in the powder bed. Examples of bases used are alkali metal hydroxide solutions, such as NaOH or KOH, alkaline earth metal hydroxides, oxides or carbonates, ammonia and/or amines.

Evolution of carbon dioxide is also observed in the polymerization of acrylamide, methacrylamide, acrylonitrile and methacrylonitrile using water-soluble peroxide polymerization initiators, polymers having a low molecular weight being obtained. The evolution of $CO_2$ is greatly suppressed if acrylamide, methacrylamide, acrylonitrile and methacrylonitrile are polymerized alone or as a mixture with one another or with the abovementioned carboxylic acids, using water-insoluble, liquid organic peroxides alone or as a mixture with up to 50% by weight, based on the initiator mixture, of water-soluble, organic compounds containing azo and-/or peroxy groups. This gives, for example, polymers of acrylamide which, for example, are more effective flocculents than polyacrylamides prepared in the presence of water-soluble initiators in a powder bed.

Water-soluble polymers are also obtained if mixtures of (a) ethylenically unsaturated $C_3$-$C_5$-carboxylic acids and/or their salts, (b) acrylamide, methacrylamide, acrylonitrile or methacrylonitrile and, if required, (c) a $C_1$-$C_8$ alkyl ester of acrylic acid or methacrylic acid, vinyl acetate, vinyl propionate, styrene or diisobutylene are polymerized. The amounts of monomers (a) to (c) are chosen so that water-soluble polymers are formed. Suitable alkyl esters of acrylic acid or methacrylic acid are the hydroxy-$C_2$-$C_4$-alkyl (meth)acrylates or the $C_1$-$C_3$-alkylamino-$C_2$-$C_5$-alkyl (meth)acrylates. Examples of suitable compounds in addition to the esters of monohydric $C_1$-$C_8$-alcohols with acrylic acid or methacrylic acid are 2-hydroxyethyl acrylate, 2-hydroxypropyl acrylate, 4-hydroxybutyl acrylate, 4-hydroxybutyl methacrylate, dimethylaminoethyl acrylate, dimethylaminoethyl methacrylate, diethylaminoethyl acrylate, diethylaminoethyl methacrylate and dipropylaminoethyl acrylate. Copolymers which are particularly useful as flocculents are obtained if acrylamide or methacrylamide is copolymerized with a di-$C_1$-$C_3$-alkylamino-$C_2$-$C_4$-alkyl (meth)acrylate. Suitable dialkylaminoalkyl esters of acrylic acid or methacrylic acid have been stated above. These compounds can be subjected to the copolymerization in any ratio with respect to acrylamide or methacrylamide.

The polymerization is carried out in a powder bed by a method in which a powder material which does not change under the polymerization conditions is initially taken in a polymerization apparatus. Suitable powders are both inorganic and organic, finely divided materials which do not react with the monomers or polymers under the reaction conditions. Examples of suitable inorganic powder materials are quartz, talc, alumina, sodium chloride and glass beads. However, an inert polymer powder which corresponds to the composition of the polymer being freshly formed from the monomer mixture or from the monomer to be polymerized is preferably taken in the polymerization zone. Where a polymer powder is not available, these polymers are prepared by a conventional polymerization technique, for example by polymerizing the monomers in the absence of a solvent and comminuting the solid polymer, by polymerizing the monomers in a water-in-oil emulsion and precipitating and isolating the polymer formed, or by precipitation polymerization or bead polymerization. The particle diameter of the powder materials is from 10 μm to 20 mm.

Examples of suitable polymerization apparatuses are kettles, stirred autoclaves and horizontal tube reactors possessing a mixing apparatus, if necessary all in the form of multi-stage cascades. Combinations of stirred kettles with downstream flow tubes are also suitable.

The powder stage in the polymerization zone is maintained during the entire duration of polymerization. The aqueous solution of the monomers or an aqueous emulsion of monomers which are insoluble or only poorly soluble in water, such as styrene or diisobutylene, is preferably applied in finely divided form onto the powder in the polymerization zone. This process step is carried out as a rule by spraying the monomer solution or emulsion either onto the powder bed or directly into the powder bed. The monomers are introduced into the polymerization zone at a rate at which they undergo polymerization. This can be effected either continuously or batchwise. During the polymerization, adequate circulation of the reaction mixture should be ensured, the mixture preferably being stirred. The heat produced during the polymerization and that generated by circulation of the powder is removed from the reaction zone by continuous vaporization of the water and of the auxiliary solvent. The concentration of the monomers in water is preferably chosen so that, with complete polymerization of the monomers, the resulting enthalpy of polymerization is just sufficient under the prevailing reaction conditions to remove the water virtually completely from the polymerization zone by vaporization. The concentration of the monomers in water is preferably from 45 to 65% by weight.

The polymerization is carried out, according to the invention, in the presence of water-insoluble organic peroxides which are liquid at 20° C., alone or as a mixture with up to 50% by weight, based on the initiator mixture, of water-soluble, organic azo initiators and/or peroxycontaining compounds which are solid at 20° C. and water-insoluble under 1013 mbar and at 23° C. or whose solubility in water under the stated conditions is no higher than 1% by weight.

The suitable organic peroxides which are liquid at 20° C. are insoluble in water at 20° C. and under 1013 mbar or have a solubility in water of not more than 1% by weight (measured at 23° C. and under 1013 mbar). Examples of suitable peroxides of this type are di-2-ethylhexyl peroxydicarbonate, tert-butyl per-2-ethylhexanoate, tertbutyl perisononanoate, tert-butyl perbenzoate, tert-butyl cumyl peroxide, di-tert-butyl peroxide, cumene hydroperoxide and/or tert-butyl hydroperoxide. The stated peroxides are preferably used alone or as a mixture with up to 50% by weight, based on the mixture of initiators, of water-soluble, organic compounds containing azogroups and/or peroxy compounds which are solid at 20° C. and insoluble in water. The water-soluble organic azo initiators are, for example, 2,2,'-azobis-(2-amidinopropane) hydrochloride and 4,4,'-azobis-(4-cyanovaleric acid). The water-insoluble polymerization initiators which are solid at 20° C. can be dissolved in, for example, polar solvents, such as methanol, ethanol, isopropanol or acetone, and can be introduced in this form into the polymerization zone, separately from the monomers to be polymerized. Examples of suitable water-insoluble organic per compounds which are solid at 20° C. are acetylcyclohexanesulfonyl peroxide, dioctanoyl peroxide, didecanoyl peroxide, dilauroyl peroxide, bis-(2-methylbenzoyl) peroxide, dibenzoyl peroxide, bis-(4-chlorobenzoyl) peroxide, dicyclohexyl peroxydicarbonate, bis-(4-tert-butylcyclohexyl) peroxydicarbonate, dimyristyl peroxydicarbonate, dicetyl peroxydicarbonate, 2,5-dimethylhexane 2,5-diperbenzoate, dicumyl peroxide and cyclohexanone peroxide. For example, the water-immiscible initiators used can be solutions of dioctanoyl peroxide in methanol, solutions of dicyclohexyl peroxydicarbonate in a mixture of methanol and isopropanol, or dicumyl peroxide in a mixture of methanol and acetone. The concentration of water-insoluble, solid organic peroxides or hydroperoxides in the water-miscible organic solvents is from 5 to 55% by weight, based on the solution.

The polymerization of the monomers can be carried out in a wide temperature range, eg. at 50°-220° C., depending on the reactivity of the monomers and the half life of the water-insoluble liquid organic peroxide. However, care should be taken to ensure that the powder state is maintained during the polymerization, ie. that the temperature during the polymerization is not less than 10° C. below the melting point, or below the beginning of the softening point, of the particular polymer to be prepared, so that the polymer particles do not stick to one another. Moreover, the pressure is adjusted to ensure that, at the predetermined temperature, water and any organic solvent used as an auxiliary solvent are evaporated from the polymerization zone. The polymerization can be carried out under atmospheric, reduced or superatmospheric pressure, eg. up to 25 bar. It may be carried out batchwise or continuously, and stirred kettles or horizontal tube reactors with mixing apparatuses of all types can be used as vessels for the reaction zone in both cases. The polymerization initiators can be introduced into the polymerization zone together with the aqueous solution of the monomers or separately from this.

In order to influence the molecular weight of the polymers, polymerization can be effected in the presence of a conventional polymerization regulator. Examples of suitable polymerization regulators are thiocarboxylic acids, such as thioglycolic acid, thiolactic acid, 3-mercaptopropionic acid, 2-mercaptobutyric acid, 3-mercaptosuccinic acid, enol ethers, 2-mercaptoethanol and mercaptopropanol, as well as transition metal acetylacetonates, such as manganese(III) acetylacetonate. The polymerization regulators are used in an amount of from 0.01 to 15% by weight, based on the monomers, while the water-insoluble, liquid organic peroxides are employed in an amount otherwise usual for polymerizations, ie. from 0.01 to 15, preferably from 0.2 to 10, % by weight, based on the mqnomers.

Depending on the monomers used, the novel process gives homopolymers or copolymers in the form of a powder whose particle diameter is from 10 μm to 20 mm, preferably from 0.1 to 5 mm. The polymers are water-soluble and have a higher molecular weight than similar polymers prepared in the presence of known water-soluble polymerization initiators. During polymerization, the evolution of $CO_2$ is greatly reduced or avoided. Compared with the conventional processes, this results in an increase in the yield during the polymerization and also an increase in the efficiency of the polymers, for example when used as flocculents, as complexing agents, as incrustation inhibitors in detergents or as textile sizes.

The carboxyl-containing homopolymers and copolymers prepared by the novel process are used, mixed with starch, as sizes for weaving cotton or cotton/polyester yarns, as encrustation inhibitors in detergents and as complexing agents for magnesium and calcium ions. The polyacrylamides are used as flocculents for the treatment of waste waters and sludges and as a strengthener in papermaking (additive for paper stock).

In the Examples, parts and percentages are by weight, unless stated otherwise. The K values were measured according to H. Fiktenscher, Cellulose-Chemie, 13 (1932), 48–64 and 71–74, in 1% strength aqueous solution at 25° C.; $K = k.10^3$ The polymerization reactor used was a cylindrical glass vessel which had a capacity of 8.5 L and was equipped with a helical stirrer and descending condenser. A spray nozzle, through which the monomers, the boiling aid and the initiator were sprayed onto the initially taken nylon granules, led into the glass vessel. A nitrogen line also led into the reactor, so that the polymerization could be carried out under a nitrogen atmosphere. The polymerization vessel was heated with the aid of an oil bath. The monomer solution was mixed with the water-insoluble liquid peroxide or a mixture of this and a solution of a watersoluble polymerization initiator in a static mixer. A heat exchanger was incorporated in the line through which monomer solution was fed to the static mixer, so that cooling could be carried out, if required. A separator was located between the polymerization vessel and the descending condenser in order to separate off any solids entrained by the nitrogen stream or the vaporizing boiling aid. To check the temperature of the reaction mixture, the polymerization reactor was equipped with a temperature probe which extended into the mixture. For carrying out polymerization and neutralization simultaneously in the reactor, the latter was connected to a solids metering apparatus, for example a metering screw, by means of which the powdered neutralizing agent was metered into the reactor. In another embodiment, a second spray nozzle led into the glass vessel, the liquid neutralizing agent being sprayed through this nozzle, likewise onto the initially taken granules.

In the apparatus described above, 1500 g of a granulated nylon obtained from adipic acid and hexamethylenediamine and having a particle diameter of from 1.5 to 3.5 mm were initially taken and heated to the reaction temperature stated in each of the Examples below, with intensive circulation.

EXAMPLE 1

A mixture of 720 g of acrylic acid and 260 g of maleic anhydride is combined with an initiator solution consisting of 82 g of tert-butyl perisononanoate in 125 ml of methanol in a static mixer, and the mixture is sprayed successively, in the course of 4 hours, onto the agitated solid bed consisting of 1500 g of nylon powder. At the same time, a solution of 580 g of sodium hydroxide in 390 g of water, which is at 80° C., is sprayed uniformly onto the thoroughly agitated surface of the stirred powder bed, likewise in the course of 4 hours. The reaction pressure is 1.2 bar. The polymerization temperature is kept constant at 135° C. by adding water to the powder bed. During the polymerization and the simultaneous neutralization, the powder state is maintained in the polymerization zone, and the water fed in is distilled off continuously, together with the water liberated during the neutralization and the methanol introduced. Thereafter, the residual monomer content of the fixed bed is reduced by maintaining a temperature of 140° C. for 2 hours with thorough mixing. The reactor contents are then milled under mild conditions in a ball mill for about 10 hours, and the copolymer of acrylic acid and maleic acid is separated from the initially taken nylon. Screening gives a copolymer of acrylic acid and maleic anhydride in the form of the sodium salt (degree of neutralization 95%), which has a K value of 39.2 and a particle size of from 1 to 2 mm. The copolymer is used as an encrustation inhibitor in detergents.

EXAMPLE 2

A solution of 896 g of acrylamide and 224 g of diethylaminoethyl acrylate in 480 g of water is combined with 160 g of tert-butyl perisononanoate in a static mixer, and the mixture is sprayed successively, in the course of 4 hours, onto the agitated powder bed which consists of 1500 g of nylon and is located in the polymerization apparatus described above. The polymerization temperature is brought to 140° C. and kept constant by adding water. The pressure is 1 bar. During the polymerization, the powder state in the polymerization zone is maintained, and the water fed in with the monomer solution and for regulating the temperature is distilled off continuously. After the monomers and the polymerization initiator have been added, the reaction mixture is kept at 140° C. for 1 hour. The contents of the reactor are then milled under mild conditions in a ball mill for about 10 hours, and the copolymer of acrylic acid and diethylaminoethyl acrylate, which has a K value of 110, a residual monomer content of less than 1.5% and a particle size of from 0.5 to 2 mm, is separated off from the initially taken nylon granules.

The copolymer of acrylamide and diethylaminoethyl acrylate is used as a strengthener for paper, the copolymer being added to the paper stock prior to sheet formation, in amounts of from 0.3 to 2% by weight, based on dry fiber.

EXAMPLE 3

In the polymerization apparatus described above, a solution of 909.1 g of acrylic acid in 307.8 g of water is combined with a mixture of 24.8 g of tert-butyl perbenzoate and 55.1 g of tert-butyl per-2-ethylhexanoate in a static mixer, and the mixture is sprayed successively, in the course of 3 hours, onto the agitated solid bed consisting of nylon powder. At the same time, a solution of 408 g of sodium hydroxide in 408 g of water is sprayed uniformly onto the thoroughly agitated surface of the stirred solid bed, likewise in the course of 3 hours, the temperature of the solution being 80° C. The polymerization temperature is 130° C. The pressure in the reactor is brought to 1.35 bar by forcing in nitrogen, and is kept constant by means of a pressure-regulating valve incorporated downstream of the descending condenser. During the polymerization, the powder state of the reaction mixture is maintained, and the water fed in is distilled off continuously, together with the water liberated during the neutralization. The amount of condensate is 840 g. Thereafter, the residual monomer content is reduced by keeping the agitated solid bed at 130° C. under 1.35 bar for a further 4 hours.

The contents of the reactor are then cooled, and milled in a ball mill for about 10 hours. As a result, the partially neutralized polysodium acrylate formed (degree of neutralization about 80%) separates from the nylon granules and can be isolated by sieving. The polyacrylic acid possessing a degree of neutralization of 80% has a residual monomer content of less than 1%, contains less than 1% of swollen particles and has a K value of 125.6. The polymer prepared in this manner, mixed with starch (2 parts of starch and 1 part of sodium polyacrylate) and in the form of a 12-15% strength aqueous solution, is used as a textile size.

EXAMPLE 4

A solution of 14.4 kg of acrylic acid and 5.2 kg of maleic anhydride is combined with 1.6 kg of tert-butyl perisononanoate in a static mixer, and the mixture is sprayed uniformly, in the course of 4 hours, onto an agitated solid bed consisting of 18 kg of nylon powder (reactor size 40 L ). At the same time, a solution of 11.6 kg of sodium hydroxide in 7.8 kg of water is sprayed uniformly onto the thoroughly agitated surface of the stirred solid bed, likewise in the course of 4 hours, the temperature of the solution being 80° C. The weight ratio of the resulting polysodium salts of acrylic acid and maleic acid is about 70:30. The reaction temperature, which is maintained by successively feeding in water, is 135° C. The reaction pressure is 1.2 bar. During the polymerization and the simultaneous neutralization, the powder state in the polymerization zone is maintained, and the water fed in with the sodium hydroxide solution and for maintaining the temperature is distilled off continuously from the reaction zone, together with the water formed as a result of the neutralization. Thereafter, the residual monomer content is reduced by keeping the still agitated fixed bed at 140° C. for a further 2 hours.

After the freshly formed copolymer has been separated off from the initially taken nylon, a copolymer having a K value of 37, a degree of neutralization of 95% and a residual monomer content of less than 1% is obtained.

COMPARATIVE EXAMPLE

If, in Example 4, the 1.6 kg of tert-butyl perisononanoate is replaced with 3.2 kg of $H_2O_2$ in the form of a 50% strength formulation (corresponding to 1.6 kg of $H_2O_2$), and the procedure is otherwise carried out in the same manner, a copolymer having a K value of 18, a residual monomer content of less than 1% and a degree of neutralization greater than 100% is obtained.

|  | Example | Comparative example |
|---|---|---|
| Starting materials: | | |
| Acrylic acid in kg | 14.4 | 14.4 |
| Maleic anhydride in kg | 5.2 | 5.2 |
| NaOH in kg | 11.6 | 11.6 |
| Initiator | 1.6 | 1.6 |
| Product: | | |
| K value (1% strength solution in $H_2O$ at 20° C.) | 37 | 18 |
| Residual monomers, in % | <1 | <1 |
| pH (2% strength solution in $H_2O$) | 6.8 | 10.3 |
| Degree of neutralization in % | ~95 | <100 |
| Amount of $CO_2$ evolved during the polymerization, in %, based on monomers | 0.2 | 6.8 |

The Table shows that, under the same conditions, the novel use of tert-butyl perisononanoate instead of $H_2O_2$ as an initiator gives a copolymer in greater yield, owing to the smaller amount of $CO_2$ evolved.

To demonstrate the efficiency of the polymers and for comparison with the conventionally prepared, prior art incrustation inhibitors based on acrylic acid and maleic acid, series of 20 washes are carried out in a Launder-0meter, and the changes in the ash content are used as a measure of the efficiency with which incrustation is inhibited.
Test conditions:
Liquor: 250 ml
Liquor ratio: 1:12.5
Hardness of the water: 22° D. (8.5 Ca:1.5 Mg)
Duration: 45 minutes
Temperature: 40-95° C. (temperature program)
Test fabric: 10 g of cotton cloth +10 g of terry cloth in each case
Detergent: 8 g/l (orthophosphate-containing)
Amount of incrustation inhibitor added: 2% by weight

| Results No. | Incrustation inhibitor | Ash content in % Cotton cloth | Terry cloth |
|---|---|---|---|
| 1 | none | 2.54 | 6.38 |
| 2 | Prior art incrustation inhibitor[1] | 0.33 | 0.35 |
| 3 | Copolymer according to Comparative Example | 0.26 | 0.23 |
| 4 | Copolymer according to Example | 0.13 | 0.17 |

[1]Prior art incrustation inhibitors, with conventional preparation of the copolymers based on acrylic acid and maleic acid.

The test results summarized in the Table show that the products prepared by the novel process and based on acrylic acid and maleic acid possess superior incrustationinhibiting properties compared with the products prepared by known standard processes.

We claim:

1. A process for the preparation of a water-soluble polymer powder, which comprises polymerizing water-soluble ethylenically unsaturated monomers in a powder bed in the presence of polymerization initiators selected from the group consisting of water-insoluble organic peroxides which are liquid under 1013 mbar under 20° C., or a mixture of the stated peroxides with up to 50% by weight, based on the initiator mixture, of water-soluble azo initiators or a mixture of the stated peroxides with up to 50% by weight, based on the initiator mixture, of water-insoluble peroxide-containing compounds which are solid at 20° C., and water, while maintaining the powder state, removing the heat of polymerization by distilling off water, and circulating the reaction mixture.

2. A process as claimed in claim 1, wherein the initiator mixture used contains a water-insoluble organic peroxide which is liquid under 1013 mbar and at 20° C. and up to 50% by weight, based on the initiator mixture, of a water-insoluble organic peroxide or hydroperoxide which is solid under 1013 mbar and at 20° C., dissolved in a water-miscible solvent.

3. A process as claimed in claim 1, wherein ethylenically unsaturated C3–C5-carboxylic acids, their amides and/or their nitriles are polymerized.

4. A process as claimed in claim 1, wherein acrylic acid, methacrylic acid, itaconic acid or maleic acid is polymerized as the water-soluble ethylenically unsaturated monomer.

5. A process as claimed in claim 1, wherein acrylic acid is copolymerized with maleic acid.

6. A process as claimed in claim 1, wherein a mixture of
   (a) ethylenically unsaturated $C_3$-$C_5$-carboxylic acids and/or their salts,
   (b) acrylamide, methacrylamide, acrylonitrile or methacrylonitrile and, if desired,
   (c) a $C_1$-$C_8$-alkyl ester of acrylic acid or methacrylic acid, vinyl acetate, vinyl propionate, styrene or diisobutylene is polymerized.

7. A process as claimed in claim 1, wherein water-insoluble organic peroxides which are liquid at 20° C. are used as polymerization initiators.

8. A process as claimed in claim 1, wherein
di-2-ethylhexyl peroxydicarbonate,
tert-butyl per-2-ethylhexanoate,
tert-butyl perisononanoate,
tert-butyl perbenzoate,
tert-butyl cumyl peroxide,
di-tert-butyl peroxide,
cumene hydroperoxide and/or
tert-butyl hydroperoxide
are used as water-insoluble, liquid polymerization initiators.

* * * * *